United States Patent [19]

Fordyce

[11] Patent Number: 4,718,402

[45] Date of Patent: Jan. 12, 1988

[54] COLLAPSIBLE ROASTING FRAME

[76] Inventor: Donald E. Fordyce, 5337 Bastille, El Paso, Tex. 79924

[21] Appl. No.: 22,259

[22] Filed: Mar. 3, 1987

Related U.S. Application Data

[63] Continuation-in-part of Ser. No. 807,447, Dec. 10, 1985, Pat. No. 4,648,379.

[51] Int. Cl.[4] .............................................. F24C 15/16
[52] U.S. Cl. ................................... 126/337 R; 99/426; 248/150; 248/153
[58] Field of Search ................ 126/337 R, 337 A, 29, 126/9 R; 99/426; 248/150, 153

[56] References Cited

U.S. PATENT DOCUMENTS

| | | | |
|---|---|---|---|
| 2,148,439 | 2/1939 | Crawford | 126/29 X |
| 2,234,596 | 3/1941 | Heilman | 126/337 R |
| 2,376,640 | 5/1945 | Wall et al. | 99/426 |
| 2,593,077 | 4/1952 | Vogt | 248/165 |
| 2,804,068 | 8/1957 | Miller et al. | 126/337 R |
| 2,846,942 | 8/1958 | Bowman | 99/427 |

Primary Examiner—Larry Jones

[57] ABSTRACT

A collapsible roasting frame for holding a roast while it is being cooked. The roasting frame is made of bent-up wire. The roasting frame comprises a ring within which a roast or fowl can be received, a support frame for holding the ring and supporting the ring in an oven or on a table. Opposed standards are pivotally attached to the support frame and cooperate with the ring to provide a structure which can be advantageously used for roasting fowl and large pieces of meat. The entire roasting frame collapses into a small area.

6 Claims, 7 Drawing Figures

COLLAPSIBLE ROASTING FRAME

REFERENCE TO RELATED PATENT APPLICATIONS

This patent application is a continuation-in-part of my previous patent application Ser. No. 807,447 filed Dec. 10, 1985; now U.S. Pat. No. 4,648,379 issued Mar. 10, 1987.

BACKGROUND OF THE INVENTION

In my copending patent application Ser. No. 807,447, there is set forth a roaster frame formed of wire and designed to fit in a roaster pan for the support of a large fowl or roast. The frame is formed so that the top end provides handles for lifting the product along with the roaster frame from the roasting pan. The roaster frame maintains the meat product free from the bottom of the pan. The roaster frame includes a separate, removable, continuous wire ring which is received within and forms part of the roaster frame and is used to support the meat product. This ring can easily be detached for transferal of the cooked product to another location where the cooked product can be carved or disjointed.

The present invention provides improvements over my copending patent application by the provision of a collapsible roasting frame wherein standards are provided at the opposed ends of the apparatus. The standards form handles and also removably receive the ring. When the ring is removed from the standards, the standards can be pivotally rotated into a retracted position, the ring placed in sandwiched relationship therewith, and the entire roasting apparatus conveniently stored in a small storage area.

Reference is made to the art cited in my previous patent application for further background of this invention.

SUMMARY OF THE INVENTION

This invention relates to a collapsible roaster frame formed of wire. The roaster frame is provided with supports and can be placed within a roaster pan. A large piece of meat, such as a roast or fowl, can be conveniently supported within the roaster frame and placed within a roasting pan. The meat, roaster frame, and roasting pan are placed in a suitable oven so that the meat product is cooked in a superior manner while the drippings are caught in the roasting pan.

The collapsible roasting frame of the present invention includes a ring, a support frame, and opposed standards. The roasting frame includes supports by which the entire apparatus is supported. The ring is oblated and made into a continuous, circular piece of wire. The frame is of rectangular configuration. In one embodiment, the marginal ends of the frame is bent vertically downward to form supports. The standards form end pieces and are in the form of an inverted U-shaped wire pieces having the lower free ends thereof bent into a hinge and attached to the support frame. The standards can be pivotally retracted into the plane of the support frame, and the ring can be sandwiched thereon to thereby provide a low profile package that can be stored in a very small storage area.

The upper marginal ends of the standards form handles by which the entire roasting frame can be manipulated.

In one particular embodiment of the invention, the support frame is turned vertically downwardly to form legs. The legs include two vertically spaced, parallel bars attached thereto. The lower bar hingedly engages the lower terminal ends of the U-shaped standard. The upper bar forms an abutment means against which the hinged standard is arrested as the opposed standards are pivoted into the upright position. A medial length of each leg of the U-shaped standard is bent into a notch which supportingly receives the inside surface of the ring therein and thereby supports the ring in an elevated position above and parallel to the support frame.

This unusual and novel structure enables a meat product to be forced into the resilient ring, the ring is then forced into engagement with the two standards so that opposed ends of the ring engage the four notches of the opposed standards, thereby supporting the meat product in an elevated position above the support frame.

In another embodiment of the present invention, the collapsible roasting frame includes a ring, support frame, and opposed standards. Each of the standards is in the form of an inverted U, and each leg of the U is apertured. Each opposed end of the frame is received through the two apertured legs of the opposed standards. A lower marginal end portion of each leg is bent at an acute angle towards a medial part of the support frame so that the terminal end of each leg can be pivoted into engagement with the frame and thereby provides a stop means when the standard is pivoted into the upright position.

A medial length of each leg of the standard is bent to provide a notch which receives an outside surface of the ring therein. The ring, when forced between the opposed standards, urges the standards outwardly away from one another, whereupon the terminal ends of the standards engage a longeron of the frame and thereby remain in the upright position. This enables the standards to support the ring elevated above the support frame so that a roast or fowl can be forced into the ring and the ring forced into position between the standards, whereupon the roast or fowl is supported above the frame.

Therefore, a primary object of the present invention is the provision of a collapsible roasting frame which can be folded into a small area.

Another object of the present invention is the provision of a collapsible roasting frame made of bent wire which can be stored in a small area.

A further object of this invention is the provision of a collapsible roasting frame having hinged standards at the opposed ends of a support frame for supporting a wire ring within which a roast or the like is received.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 4 is a perspective, assembled view of an alternate embodiment of the present invention;

FIG. 5 is a perspective, disassembled view of the embodiment disclosed in FIG. 4;

DETAILED DESCRIPTION OF THE PREFERRED EMBODIMENT

Figure 1:
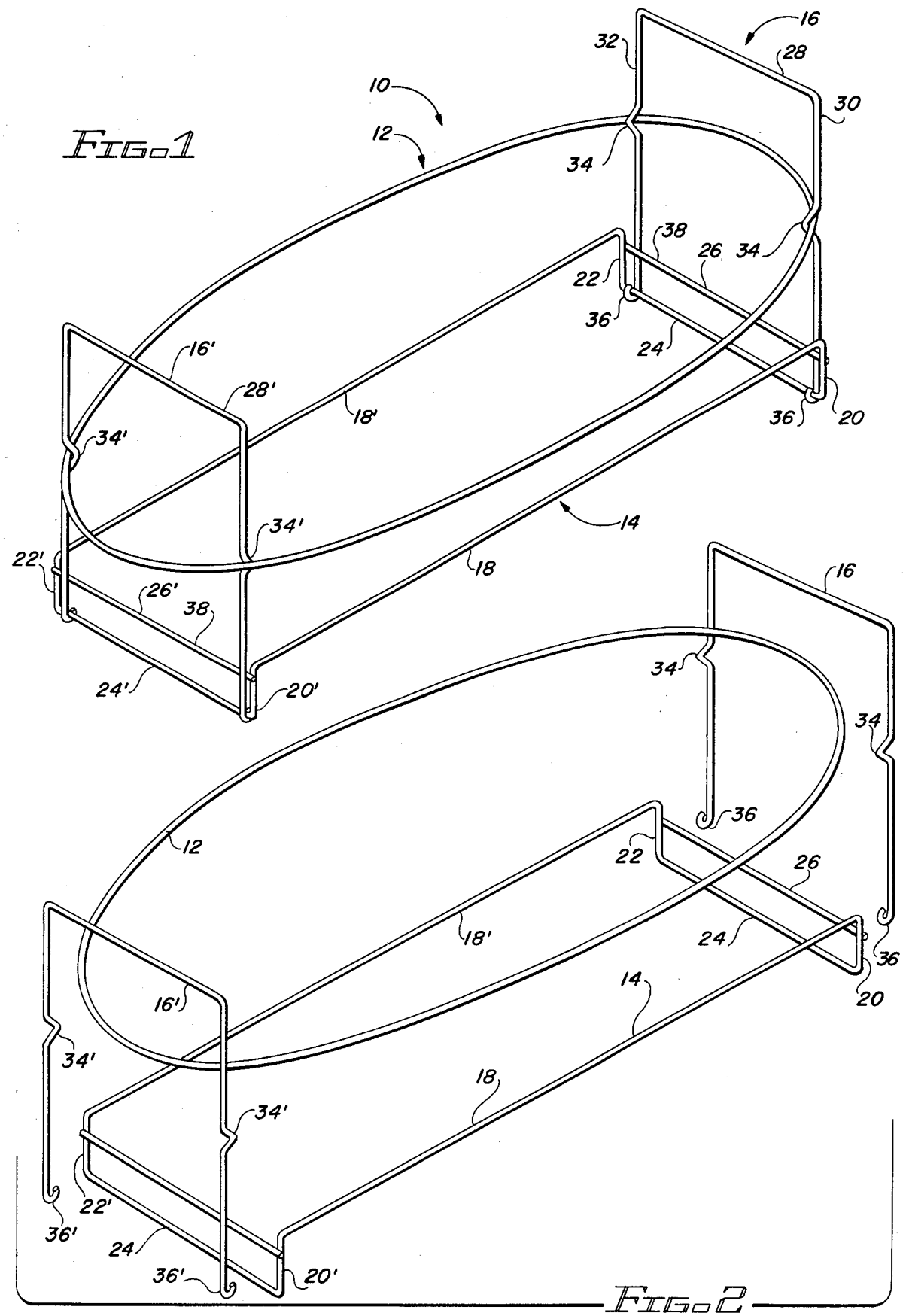
FIG. 1 is a perspective view of the collapsible roasting frame of the present invention, operatively assembled, and ready to receive a roast or fowl therein.
Figure 2:
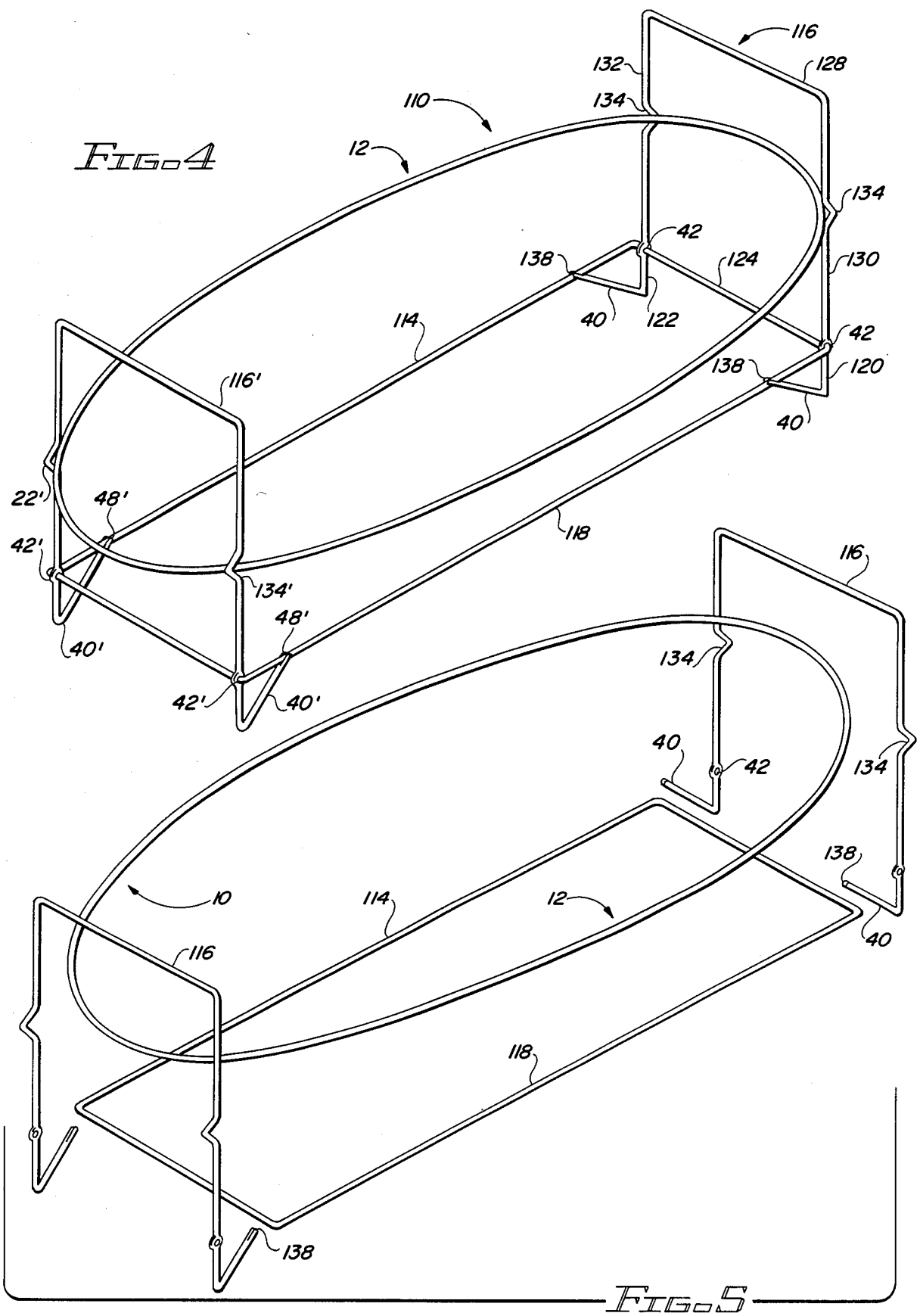
FIG. 2 is a perspective, disassembled view of the roasting frame disclosed in FIG. 1.
Figure 3:
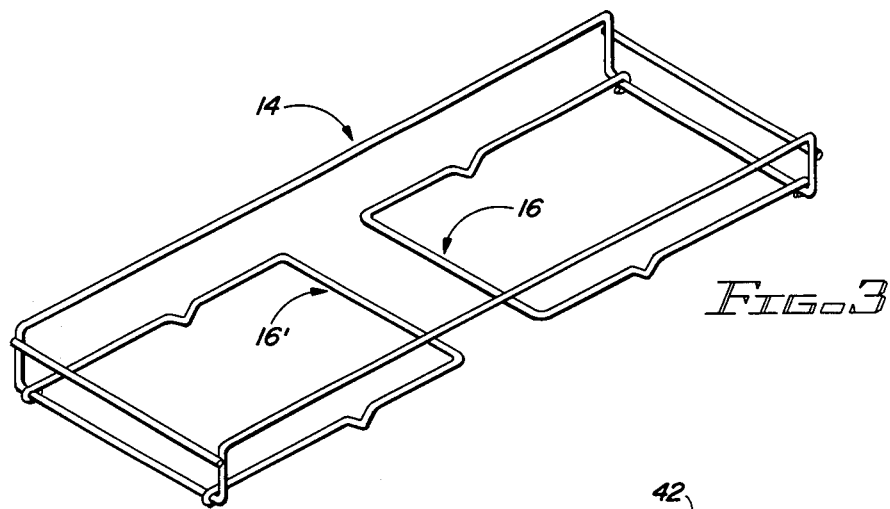
FIG. 3 is a view of part of the apparatus disclosed in FIG. 1; and shown in the collapsed configuration.

In FIGS. 1–3 of the drawings, there is disclosed a collapsible roasting frame 10 made in accordance with this invention. The roasting frame 10 is comprised of a ring 12, a support frame 14, and opposed standards 16, 16'.

The support frame 14 is of rectangular configuration and includes opposed parallel longerons 18, 18' spaced from one another and arranged in a horizontal plane. The marginal opposed ends of the rectangle are turned vertically downward to provide opposed legs seen at 20, 20' and 22, 22'. At the opposed ends of the support frame there is included a hinge bar 24 which defines the opposed terminal ends of the ractangular frame. An abutment bar 26 is spaced from the hinge bar and parallel thereto. The hinge bar and abutment bar lie in a common vertical plane at each opposed end of the frame. The hinge bars and longerons can be one continuous length of wire while the abutment bar can be a short piece of wire welded to the support frame and forming part thereof.

The opposed standards 16, 16' are in the form of an inverted U-shape, bent-up piece of wire having an upper end 28 which forms a tie bar. The tie bar is parallel to the abutment bar 26 and hinge bar 24. The tie bar 28 is connected to the vertical legs 30, 32. A medial length of each of the legs 32 are bent at 34 to provide a notch within which the aforementioned ring is supportedly received in the illustrated manner of FIG. 1. The terminal ends of the legs 30, 32 are bent into a hinge 36, 36 and 36', 36'. The hinge wraps about the hinge bar 24 and forms the hinge end of the standard 16, 16'. Accordingly, the tie bar 28 can be pivoted about the hinge bar 24 from the illustrated operative position of FIG. 1 into the illustrated collapsed position of FIG. 3.

Numeral 38 indicates the location where abutting engagement occurs between the standards and the abutment bars 26, 26'. The standards, when placed in the vertical position of FIG. 1, receive the ring 12 thereabout, with the standards being biased or sprung toward one another by the resilient cooperative action of the ring and the standards. It is preferred that both the ring and the two standards 16, 16' be slightly deformed when in the assembled configuration of FIG. 1, as compared to the retracted or collapsed configuration of FIG. 3.

When the collapsible cooking frame 10 is not in use, the ring 12 is removed from the standards 16, 16', the standards are rotated about the hinges in opposite directions into the configuration set forth in FIG. 3, whereupon the frame 14, standards 16, 16' and ring 12 can all be assembled in superimposed or sandwiched relationship, and thereby present a low profile package which can be stored in a very small storage area.

The collapsible roasting frame can receive a roast, fowl, or other meat products within the interior thereof; and, the ring can be placed about the standards in the illustrated manner of FIG. 1. The entire collapsible cooking frame and meat product can then be placed in a suitable roasting pan. Then the pan, collapsible roasting frame, and meat product can all be placed in an oven until the meat is cooked. This novel collapsible roasting frame elevates the meat product respective to a roasting pan and thereby enables the hot gases within the oven to freely circulate thereabout and cook the meat product in a superior manner. The meat and roasting frame is easily manipulated by the handles provided by the standards 16, 16'.

In the embodiment set forth in FIGS. 4–7, the collapsible roasting frame 110 includes the before mentioned ring 12, a frame 114 which differs from the previously discussed frame 14, and opposed standards 116 which likewise differ from the before mentioned standards 16, 16'.

The standards 116 are bent into a U-shape, with there being a tie bar 128 across the top, and vertical leg portions 130, 132 which extend at 120, 122 and are bent back upwardly at 40 into abutting engagement with the longerons 118. Each leg 130, 132 is notched at 134 and apertured at 42. The notch 134 receives the ring 12 in supported relationship therewithin, while the apertures 42 receive the hinge bar 124 therethrough.

Figure 6:
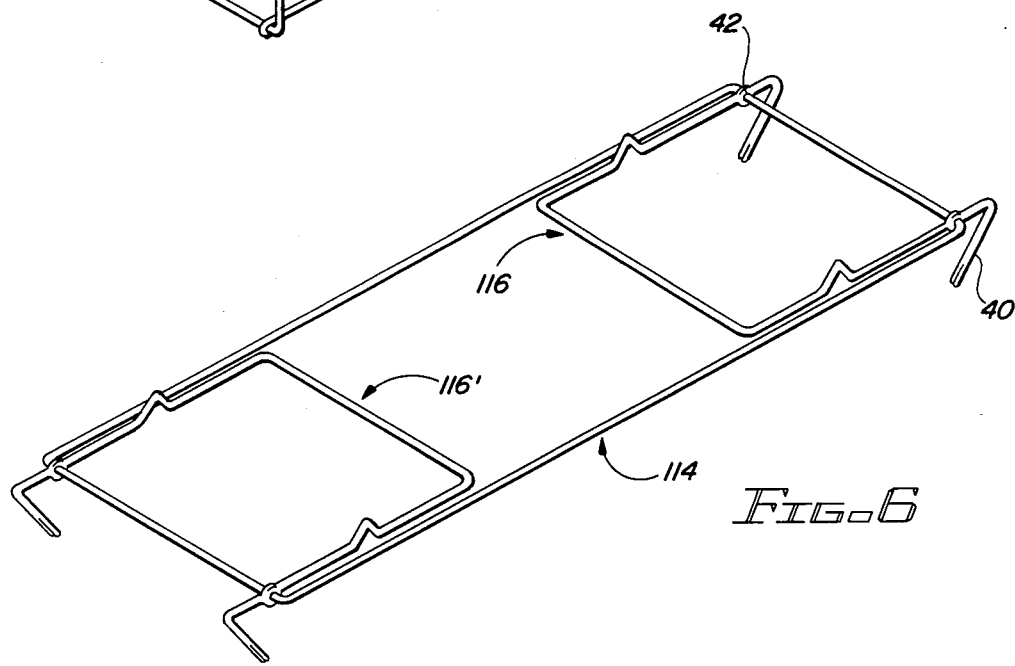
FIG. 6 is a perspective view showing the apparatus of FIG. 4 in the collapsed configuration; and, FIG. 7 is an enlarged, fragmentary, detailed view of part of the apparatus disclosed in FIG. 4.
Figure 7:
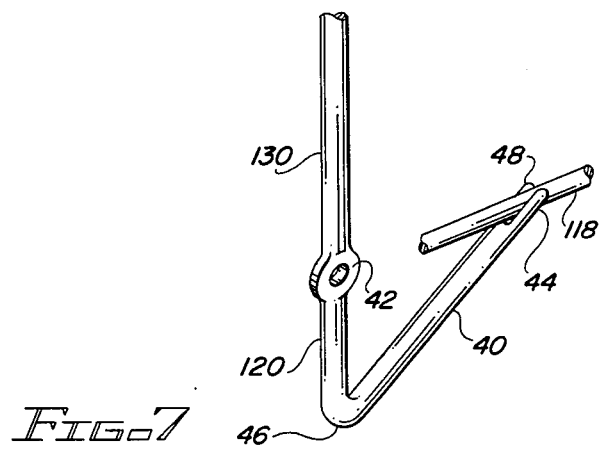

As best seen in FIG. 7, the angled leg part 40 has a bifurcated terminal end 44 that resembles a fork. The fork receives longeron 18 therewithin. Therefore, the fork 44 and longeron 118 abuttingly engage one another as indicated by the arrow at numeral 48. The longeron, together with the leg part 40, form a stop means for preventing the standards 116, 116' from being folded away from one another beyond the vertical. The standards 116, 116' can be folded about hinge bar 124 into the collapsed position illustrated in FIG. 6.

The standard 116' is identical to the standard 116 and therefore the details thereof have already been set forth herein.

The second embodiment 110 of the invention is stored in the collapsed configuration shown in FIG. 6, with the ring 12 being placed in sandwiched or superimposed relationship therewith. The standards 116, 116' are pivoted into the upright position until the stop means 138 abuttingly engage one another. Next, the meat product to be cooked is forced into the interior of the ring 12, and the ring 12 is forced downward between the confronting sides of the standards 116, 116' until the notches 134 receive the outside surface of the ring therewithin. This action springs the standards 116, 116' away from one another, with this force being resisted by the stop means 138. Hence, all of the components of the collapsible roasting frame are slightly sprung from its disassembled configuration, with some of the parts being placed in tension, some in shear, and some in compression to thereby maintain the apparatus in the assembled configuration set forth in FIG. 4.

The collapsible roasting frame is then placed in a roasting pan as in the before described manner of the first embodiment 10 of the invention.

The collapsible roasting frame of the present invention can be made in a number of sizes so that it can accommodate various different sizes and weights of meat products. The ring can be made more or less oblated as may be required to receive a particular size meat product. It is possible for the ring to be made almost square, although such a configuration is not as desirable as the one set forth in the figures of the drawings.

The composition and diameter of the wire is selected to impart the desired design expedient into the apparatus of the present invention. Stainless steel wire 3/16 inch diameter is suitable for fabricating the present invention.

I claim:

1. A collapsible roasting frame adapted to fit within a roasting pan and hold a fowl or roast;

said roasting frame comprises a support frame, standards at each opposed end of said support frame, and a removable ring member made of bent wire; means by which said standards are pivotally attached to said support frame and which provide handles at the upper ends thereof; legs provided at the bottom of said support frame, and notches in said standards at a location above the legs and below the handles;

said ring member is removably supported within said notches with said handles being located above said ring member; whereby:

a product to be cooked is placed within said removable ring member, said removable ring member is received within said notches on said standards so that the roasting frame containing the product can be placed within a roasting pan where the product is supported free of the bottom of the pan.

2. The roasting frame of claim 1 wherein said removable ring member is an endless wire; and, said support frame is rectangular in form.

3. The roasting frame of claim 1 wherein said support frame is an endless length of wire which is bent up to provide legs at the opposed ends thereof.

4. The roasting frame of claim 3 wherein said standards include stop means against which the standards are pivoted into a perpendicular position respective to said support frame.

5. The roasting frame of claim 1 wherein said ring member is an endless wire; and, said support frame is rectangular in form;

wherein said frame is an endless wire and includes means by which each said standard can be pivoted from a perpendicular into a parallel position respective to said support frame.

6. A roasting frame for holding a meat product while it is being cooked, said roasting frame comprises a ring, a support frame, and opposed standards;

said ring is of oblated configuration and of a size to be received in supported relationship by said opposed standards;

said support frame is a length of wire bent into the form of a rectangle;

means by which each said standard is hinged to said support frame and is pivotal from a folded up position into an assembled position;

stop means for maintaining each said standard perpendicular respective to said frame; each said standard has opposed legs; notches formed in each leg of each said standard by which said ring is releasably received within said notches while said standards are urged into abutting relationship respective to said frame; whereby, a meat product can be received within said ring, the ring can be supported by said standards, said standards are supported by said support frame, so that the meat product can be placed within a roasting pan where it is held elevated therewithin.

* * * * *